United States Patent [19]

Muller

[11] Patent Number: 4,578,725
[45] Date of Patent: Mar. 25, 1986

[54] VCR WITH IMPROVED FAST WINDING STATIC ELECTRICITY DRAIN

[75] Inventor: Johannes C. A. Muller, Eindhoven, Netherlands

[73] Assignee: U.S. Philips Corporation, New York, N.Y.

[21] Appl. No.: 481,707

[22] Filed: Apr. 4, 1983

[30] Foreign Application Priority Data

Apr. 15, 1982 [NL] Netherlands ..................... 8201573

[51] Int. Cl.⁴ .............................................. G11B 15/66
[52] U.S. Cl. ........................................... 360/85; 360/95
[58] Field of Search ................... 360/85, 83–84, 360/93–95

[56] References Cited

U.S. PATENT DOCUMENTS

| 3,601,654 | 8/1971 | Long et al. | 360/132 |
| 3,939,491 | 2/1976 | Shigeta | 360/85 |
| 3,968,517 | 7/1976 | Chimura et al. | 360/85 X |
| 4,035,843 | 9/1977 | Tanimura | 360/35 |
| 4,121,267 | 10/1978 | Hayashi | 360/85 |
| 4,285,020 | 1/1980 | Sato | 360/132 |
| 4,339,776 | 7/1982 | Langer et al. | 360/69 |
| 4,348,706 | 9/1982 | Videc | 360/130.24 |
| 4,408,236 | 10/1983 | Murata et al. | 360/85 |

FOREIGN PATENT DOCUMENTS 3105536 9/1981 Fed. Rep. of Germany .
3043041 12/1981 Fed. Rep. of Germany .
165118 5/1958 France .

Primary Examiner—John H. Wolff
Assistant Examiner—David J. Severin
Attorney, Agent, or Firm—David R. Treacy

[57] ABSTRACT

Static electricity is drained from a magnetic tape by a draining element mounted on a movable support which also carries the movable guides that pull tape from the cassette and wrap it around the drum in a playing loop during the play mode of operation. In the inoperative position the run of tape across the front of the cassette passes between the movable playing-loop guide and the static draining element. Preferably, the draining element is not in contact with the magnetic tape in the play mode.

12 Claims, 3 Drawing Figures

VCR WITH IMPROVED FAST WINDING STATIC ELECTRICITY DRAIN

BACKGROUND OF THE INVENTION

The invention relates to a magnetic-tape deck for cassettes containing a magnetic tape which can be transported between two reels, such as the well-known VCR, that is a deck which comprises: a chassis; at least one magnetic head which is movable in a circular path; a drum having a circumferential surface for guiding a length of magnetic tape which is wrapped around a part of the drum and which cooperates with the magnetic head; a playing-loop device for withdrawing a length of magnetic tape from the cassette and subseqyently wrapping it around the drum to form a playing loop in a "play" mode of operation of the deck, the drum being situated in the central part and the reels at the ends of the playing loop, and a fast winding mechanism having an element for draining static electricity from the tape.

In the decks with which the invention is used, playing-loop device comprises first and second playing-loop guides for guiding the playing loop in guide positions upstream and downstream respectively of the drum, and first and second playing-loop-guide supports which are movable between an inoperative position, in which the playing-loop guides are disposed in the cassette, and an operative position, in which the playing-loop guides are in the upstream and downstream guide positions.

The fast-winding mechanism, for fast winding of the magnetic tape between the reels in the cassette during a "fast-forward" or "fast reverse" mode of operation of the deck, comprises a fast-winding-loop device for withdrawing a length of magnetic tape from the cassette and subsequently guiding it to form a fast-winding loop outside the cassette. The fast-winding-loop device comprises at least one fast-winding-loop guide; a fast-winding-loop-guide support for the fast-winding-loop-guide, which support is movable between an inward position, in which the fast-winding-loop guide is disposed inside the cassette at the back of the magnetic tape, and a fast-winding position, in which the fast-winding-loop guide is disposed outside the cassette; and a positioning device for moving the fast-winding-loop guide support between the said positions.

The deck also includes at least one draining elements of an electrically conductive material which during fast-winding is in contact with the front of the length of magnetic tape that has been withdrawn from the cassette to form a fast-winding loop, and which drains static electricity from the front of the magnetic tape. As used in this specification a "loop" in the tape is defined as a stretch of tape from one tape spool to another tape spool.

Magnetic-tape decks which are substantially of this type are in use in large numbers in home-entertainment video recorders; see, for example, U.S. Pat. No. 3,939,491. The advent of the video recorder as an apparatus suitable for domestic use has been accelerated by a number of developments, such as the availability of cassettes, improved and automatic playing-loop devices, improved magnetic tapes which in conjunctions with improved magnetic heads make it possible to obtain a substantially higher information density and thus a substantial reduction in tape consumption, and the progress in micro-electronics which enables extensive and intricate circuitry to be manufactured at an acceptable cost.

Mainly two different types of playing-loop devices are used in current video recorders. Perhaps most frequently used are playing-loop devices in which the magnetic tape is formed into a roughly M-shaped loop, the co-called "M-loop wrap" devices. This nearly always concerns helical-scan magnetic-tape recorders in which the magnetic tape is wrapped around the drum in a helical path. In helical-scan magnetic-tape recorders the M-shape of the loop is especially apparent in a plan view of the apparatus. All the parts of the M are not situated in one plane because the magnetic tape is wrapped helically around the drum. The magnetic tape is wrapped around the drum starting from a leading-end point at one side of the drum towards an axially offset trailing-end point at the other side of the drum.

Another frequently used playing-loop device is the so-called "C-loop" device in which the magnetic tape is wrapped around the drum substantially along one side in a more or less circular path, so that the drum is disposed in the centre of the C. The magnetic tape extends from one reel along the outside of the C, is then diverted and returns to the other reel via the inside, along the drum.

It has been found that in magnetic-tape decks problems may occur as a result of static electricity produced during unwinding, transport and taking-up of the magnetic tape. These problems occur mainly during fast winding of the magnetic tape, because the degree of electrostatic charging depends on the speed of transport of the magnetic tape and because in the fast winding mode, in contradistinction to the recording and/or play-back modes, the magnetizable front side of the magnetic tape is generally not in contact with the drum or with other metal tape guides.

The formation of electrostatic charges in magnetic tapes whose magnetizable front layer is not electrically conductive is described in, for example, U.S. Pat. No. 3,601,654 (herewith incorporated by reference). When two layers which are constantly in contact with each other are separated from one another static charge is formed on the surfaces which were previously in contact. This effect is most pronounced when the materials are poor elecrical conductors, because the charge is retained longer by such materials.

When a nonconductive magnetic tape is unwound from a reel, the back of the outermost turn of the roll is separated from the front of the next turn, so that static electricity is generated in an unpredictable pattern. As more magnetic tape is wound onto the other reel, the charge at the back of the magnetic tape would cancel the opposite charge at the front of the magnetic tape if the diameters of the two rolls were constantly equal to each other. The electrostatic-charge pattern at the back would then always correspond to the pattern at the front of the magnetic tape. However, since this situation occurs only momentarily, halfway along the length of the magnetic tape, a residual static-charge pattern will persist on the magnetic tape after it has been transferred from one reel to the other.

Any static charge on the magnetic tape will cause problems. Apart from the fact that it causes the magnetic tape to stick, which may lead to an irregular tape transport and possible even to folding and jamming of the magnetic tape in the cassette, the surface of the magnetic tape will attract dust particles. These particles may impair the correct operation of the magnetic heads and may also contribute to wear of the magnetic heads. In addition, the static charge may also lead to the magnetic tape being incorrectly wound onto the reels.

In some cases of incorrect winding, folds may form in the magnetic tape inside the cassette to the extent that the cassette becomes unserviceable. At the least, creases may be formed locally in the magnetic tape so that it is no longer suitable for recording or playback. It will be obvious that these problems occur mainly in the case of magnetic tapes whose materials at the back and at the front give rise to the occurrence of considerable electrostatic charges and in the case of thin magnetic tapes. Modern magnetic tapes are very thin, their thickness being of the order of 15 microns. There is a tendency to reduce the thickness of magnetic tapes even further, to thicknesses of the order of 6 to 10 microns.

It is assumed that the degree of electrostatic charging of the magnetic tapes is proportional to the speed with which the surfaces of the two layers are separated from each other, under specific atmospheric conditions. Consequently the problem is mainly of significance during fast winding of the magnetic tape.

The phenomenon of the formation of electrostatic charges in magnetic tapes having a magnetisable front layer which is electrically well conductive, for example, a vacuum-deposited metal coating, is described in, for example, U.S. Pat. No. 4,285,020 (herewith incorporated by reference). The static charge does not remain at one location but distrubutes itself over the length of the tape. The charge may, for example, be caused by tribo-electrification as a result of friction. Eventually the electric potential may become so high that flash-over occurs between the magnetiseable front side and metal parts in the vicinity of the magnetic tape.

The prior art provides various solutions for draining static electricity from the front side of a magnetic tape in a cassette. For example, the afore-mentioned U.S. Pat. No. 3,601,654 describes a modified standard audio cassette comprising draining elements in the form of electrically conductive tape guides inside the cassette, which elements are in contact with the front of the magnetic tape and which are electrically connected to other tape guides which are in contact with the back of the magnetic tape. The casette housing may be metallised or made of metal, the cassette being grounded through the magnetic-tape apparatus during use of the cassette on a magnetic-tape apparatus. The afore-mentioned U.S. Pat. No. 4,285,020 also relates to a magnetic-tape cassette in which static electricity can be drained from the front side of the magnetic tape to parts of a magnetic-tape apparatus by means of an electrically conductive draining element. Such methods therefore necessitate the use of draining elements in the cassette which cooperate with the front of the magnetic tape. This makes the construction of the cassette more intricate and it leads to a higher cost-price of the cassette. Especially in the case of cassettes for use in magnetic-tape decks of the type mentioned in the opening paragraph, additional tape guides in the cassette, apart from the previously mentioned undesirable effects, are undesirable because they adversely affect the uniformity of the transport speed of the magnetic tape during the recording and/or reproduction of signals and also the correct guidance of the magnetic tape relative to the tape guides and loop guides present on the deck. This is because the tape guides in the cassette have been aligned accurately relative to the cassette housing and not relative to the deck.

From the afore-mentioned U.S. Pat. No. 3,939,491 a video-recorder deck equipped with a C-loop device is known, comprising a fast-winding-loop device having two movable fast-winding-loop-guide supports with fast-winding-loop guides which engage behind the magnetic tape in the cassette. By means of the fast-winding-loop guides the magnetic tape can be withdrawn from the cassette over some distance, enabling fast winding to be effected in this situation. The length of magnetic tape withdrawn from the cassette to form a fast-winding loop is led from one reel to the other reel tangentially to the drum and over a pair of stationary tape guides, which are arranged on the deck and which cooperate with the magnetisable front of the magnetic tape. A stationary magnetic head is capable of detecting the presence of pulses on the magnetic tape and transferring these pulses to a counting circuit for measuring the length of the magnetic tape thus transported. Such a video recorder permits fast winding with a part of the magnetic tape outside the cassette, the front of this part of the tape being in contact with electrically conductive tape guides which are capable of draining the static electricity.

The fast-winding-loop device known from U.S. Pat. No. 3,939,491 for withdrawing the magnetic tape from the cassette and subsequently guiding this tape outside the cassette during fast winding is not suitable for use in magnetic tape decks comprising an M-loop device. Stationary draining elements on the chassis of the deck in the case of the known C-loop device do not impede the formation of a loop of magnetic tape around the drum, because the playing-loop guides move along one side of the drum. In an M-loop device this presents more problems becuse the playing-loop guides then move on both sides of the drum, so that stationary draining elements, at least in the case of a compact construction, may form an obstacle. A further disadvantage of this known magnetic-tape apparatus is that a comparatively large distance is required between the cassette and the drum. The present tendency, at least in video recorders, is to make the deck as compact as possible. This is particularly important in decks for portable video recorders, especially if the deck is to be incorporated into an electronic camera.

SUMMARY OF THE INVENTION

It is an object of the invention to provide a magnetic-tape deck of the type mentioned in the opening paragraph with the advantage that the deck is suitable for compact magnetic-tape recorders which may be equipped with a C-loop device or an M-loop device, without requiring the use of draining elements in the cassette for draining static electricity from the front of the magnetic tape.

According to the invention, a draining element is arranged on at least one of the playing-loop-guide supports in a position substantially opposite the playing-loop guide on that support and on the opposite side of the magnetic tape from the guide. By arranging the draining element on a playing-loop-guide support in the manner described, the draining element never impedes the formation of the playing loop because the element always moves in front of the playing-loop guides during the formation of the playing loop.

During fast-winding the draining element is disposed close to the cassette, so that little space is needed between the cassette and the drum. In a preferred embodiment of the invention the draining element is clear of the magnetic tape in the playing mode of operation of the deck. In the playing mode of operation it is generally not necessary to drain static electricity from the front of the magnetic tape by means of a draining element. Thus the use of this embodiment of the invention permits the friction in the playing loop to be reduced. A further advantage is that a draining element, which co-operates with the magnetic tape during fast winding only, does not influence the lace-up in the playing loop and therefore need not be positioned with a high accuracy relative to the playing-loop guides.

A further embodiment of the invention relates to a magnetic-tape deck of the type mentioned in the opening paragraph. This deck is equipped with a capstan whose speed is controlled accurately, and a pressure device for pressing the magnetic tape against the capstan in the "playing" mode for the purpose of accurately controlling the transport speed of the magnetic tape. The pressure device comprises a pressure roller and a pressure-roller support which is movable between an inward position, in which the pressure roller is located inside the cassette at the back of the magnetic tape, and a pressing position in which the pressure roller presses the magnetic tape against the capstan.

This embodiment is characterized in that the pressure roller serves as a fast-winding-loop guide and the pressure-roller support serves as the fast-winding-loop-guide support, the fast-winding position of the pressure-roller support being disposed between the inward position and the pressing position. This embodiment utilizes the pressure roller for an additional function, namely that of fast-winding-loop guide. Its high quality bearing arrangement makes the pressure roller suitable for this additional function.

A further embodiment of the invention is characterized in that two fast-winding-loop guides are arranged so that during fast winding the playing-loop guides are disposed between the fast-winding-guides, and each of the playing-loop-guide supports carries a draining element. This embodiment is of particular importance in decks intended for use in conjunction with cassettes of the type described in the previously filed but not duly published Netherlands patent application No. 8201009 to which U.S. patent applications, Ser. Nos. 447,043 and 470,842 filed Dec. 6, 1982 and Feb. 28, 1983 respectively, correspond (herewith incorporated by reference). Some of the cassettes described in this application do not comprise any tape guides at all which could guide the magnetic tape during fast-winding. Therefore, when such cassettes are used, the deck should be provided with a fast-winding-loop guide near each the front corners of the cassettes. These guides each withdraw the magnetic tape from the cassette over a certain distance in order to form a fast-winding loop. The presence of a draining element on each of the two playing-loop-guide supports precludes contact of the magnetic tape with the drum or with a movable magnetic head, as the case may be, even if the drum is situated close to the cassette.

Other types of such cassettes do comprise tape guides for fast winding of the magnetic tape in the cassette but these guides need not be used. Fast winding of the magnetic tape solely by means of fast-winding-loop guides on the deck has advantages over fast winding inside the cassette, even if this is possible in principle. The friction may be reduced by a suitable bearing arrangement of the fast-winding-loop guides or, if stationary pins are employed, by a suitable choice of the materials and the diameter. Moreover, the reels of the cassette are generally centered relative to spindles arranged on the deck. Fast-winding-loop guides belong to the deck and can therefore be aligned accurately relative to the spindles. This promotes a satisfactory and uniform take-up of the reels. A further advantage of this embodiment is that the draining of static electricity is always effected close to the reel from which the magnetic tape is unwound, both during the "fast forward" and "fast reverse" modes of the operation of the deck. This minimizes the adhesion of dust particles to the tape in both cases.

An embodiment of the invention will be described in more detail, by way of example, with reference to the drawing.

DESCRIPTION OF THE PREFERRED EMBODIMENTS

Figure 1:
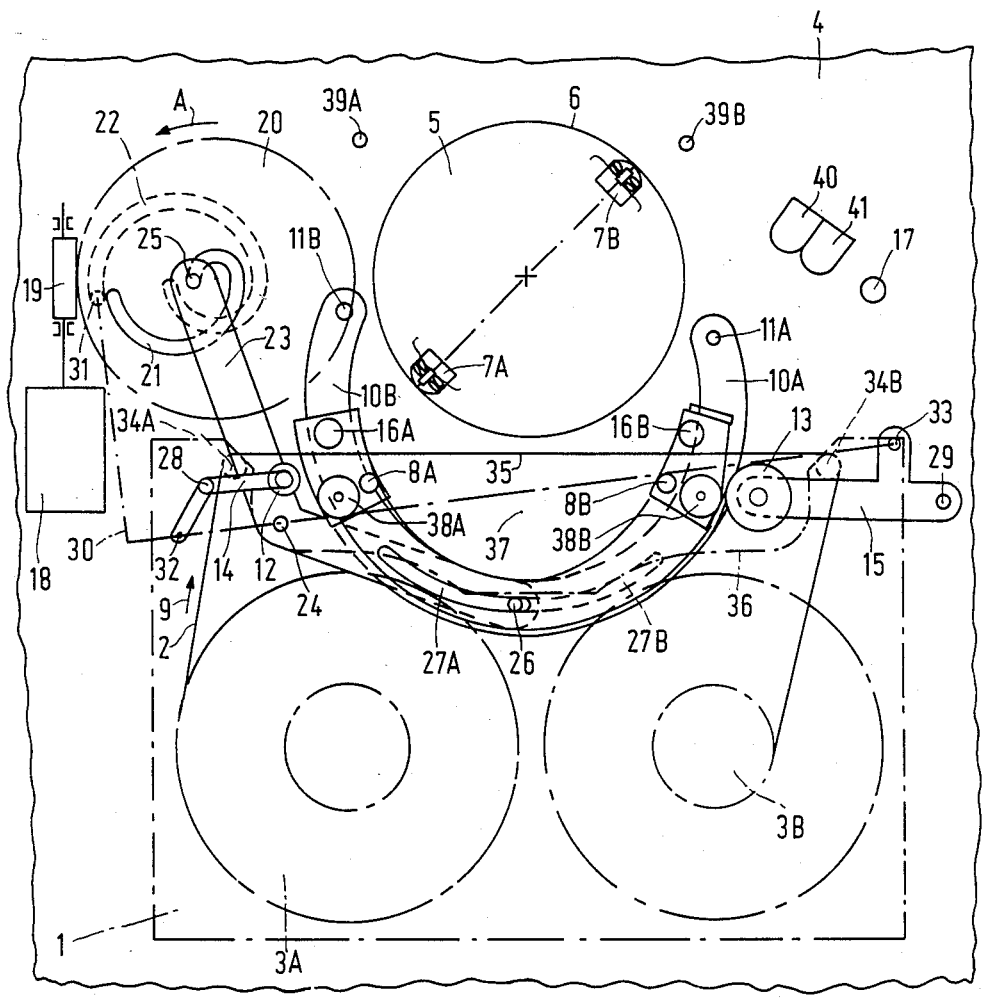
FIG. 1 is a schematic plan view of a deck of a magnetic video tape apparatus, the magnetic tape being shown still wholly inside the cassette.

The position of a cassette 1 on the deck is indicated by dash-dot lines. The magnetic tape 2 is represented by an unbroken line and is movable between two reels 3A and 3B.

The deck comprises a chassis, of which for the sake of clarity only a part in the form of a deck plate-4 is shown. The deck carries a drum 5 having a circumferential surface 6 for guiding a length of the magnetic tape 2 which is wrapped around a part of the drum. The drum, which is represented schematically by its circumference, may comprise, for example, a stationary lower drum and coaxial rotary upper drum. It may be constructed to carry, for example, two magnetic heads 7A and 7B, which are both movable in a circular path. In general such a drum will be inclined relative to the deck plate 4, but for simplicity this is not shown.

Helical-scan magnetic tape recorders are well known and are commercially available on a large scale. Therefore, the schematic character of the drawing will not prevent a correct understanding of the operation of the deck. Moreover, much literature relating to such decks is available, reference being made to, for example, the prior European patent application No. 80 200 630.4, which has been laid open to public inspection, to which U.S. Pat. No. 4,348,706 corresponds (herewith incorporated by reference). Further, magnetic-tape decks are known in which the drum is not inclined and which do not record oblique tracks on the magnetic tape; see, for example, U.S. Pat. No. 4,035,843.

The magnetic-tape deck shown comprises a playing-loop device for withdrawing a length of the magnetic tape 2 from the cassette and subsequently wrapping it around the drum 5 to form a basically M-shaped playing loop during "play" mode of operation of the deck, the drum 5 being disposed in the center and the reels 3A and 3B at the ends of the M-shaped playing loop. For this see FIG. 2. The playing-loop device comprises first and second playing-loop guides in the form of pins 8A and 8B for guiding the playing loop in guide positions upstream and downstream of the drum 5 respectively. The arrow 9 indicates the normal direction of transport of the magnetic tape 2 during playing, so that in the normal play mode the pin 8A is situated upstream of the drum and the pin 8B is situated downstream of the drum. In the case of an inclined drum 5 the pins 8A and 8B will also be inclined relative to the deck plate 4, but for simplicity this is not shown in the drawing.

The playing-loop guides 8A and 8B are arranged on playing-loop-guide supports 10A and 10B respectively. These supports comprise two levers which are pivotable about pivots 11A and 11B on the deck plate 4. The two levers are movable between an inoperative position (see FIG. 1), in which the playing-loop guides 8A and 8B are disposed inside the cassette 1, and an operative position (see FIG. 2), in which the playing-loop guides 8A and 8B are in the upstream and downstream guide positions.

A fast winding mechanism permits fast winding of the magnetic tape between the two reels in the cassette in a "fast forward" or "fast reverse" mode of operation of the deck. This mechanism includes a fast-winding-loop device for withdrawing a length of a magnetic tape from the cassette and subsequently forming it into a fast-winding loop outside the cassette (see in particular FIG. 3). Two fast-winding-loop guides, which comprise a guide roller 12 on one side of the drum and a guide roller 13 on the other side are arranged on fast-winding-loop-guide supports in the form of levers 14 and 15. The levers are movable between an inward position, in which the fast-winding-loop guides 12 and 13 are situated inside the cassette at the back of the magnetic tape, and a fast-winding position (see FIG. 3), in which the fast-winding-loop guides are disposed outside the cassette. Because of this movement of two fast-winding-loop guides, the playing-loop guides and their support can remain in the inoperative position during fast winding. The positioning device for moving the fast-winding-loop-guide supports between these positions and for moving the playing-loop-guide supports between their afore-mentioned positions will be described in more detail hereinafter.

For draining static electricity from the front of the magnetic tape during fast winding two draining element 16A and 16B are in contact with the front of the length of magnetic tape which has been withdrawn from the cassette to form a fast-winding loop. These draining elements are arranged on the playing-loop-guide supports 10A and 10B respectively in positions substantially opposite the playing-loop guides 8A anb 8B and on the opposite side of the magnetic tape 2 from these guides. The draining elements 16A and 16B are so arranged relative to the playing-loop guides 8A and 8B that in the play mode of the deck the draining elements are clear of the magnetic tape (see FIG. 2) and do not influence the tape lace-up in the play mode.

The deck is equipped with a capstan 17 whose speed of rotation is controlled accurately, and with a pressure device for pressing the magnetic tape 2 against the capstan during the play mode for the purpose of accurately controlling the speed of transport of the magnetic tape. The pressure device, in the customary manner, comprises a pressure roller which in this embodiment is the guide roller 13. The fast-winding-loop-guide support 15 also functions as a pressure-roller support for moving the pressure roller between an inward position, in which the pressure roller is disposed inside the cassette at the back of the magnetic tape (see FIG. 1), and a pressing position, in which the pressure roller urges the magnetic tape against the capstan (see FIG. 2). As shown in FIG. 3, the fast-winding position of the pressure-roller support, or fast-winding-loop-guide support, is situated between the inward position shown in FIG. 1 and the pressing position shown in FIG. 2. The two fast-winding-loop guides 12 and 13 are arranged near the front corners of the cassette 1 in positions such that during fast winding the playing-loop guides 8A and 8B are located between the fast-winding-loop guides.

The use of two draining elements 16A and 16B ensure that the fast-winding-loop cannot contact the drum 5. In this way it is possible to guide the magnetic tape during fast winding solely by means of the tape guide means on the deck, namely, the two fast-winding-loop guides 12 and 13 and the two draining elements 16A and 16B.

For moving the playing-loop-guide supports 10A and 10B and the fast-winding-loop-guide supports 14 and 15 a positioning device comprises a motor 18, a worm 19 and a worm wheel 20 driven by the worm. The worm wheel is formed with a cam track in the form of a groove 21 in its upper surface and with a further cam track in the form of a groove 22 in its lower surface. A lever 23 is pivotable about a pivot 24 on the deckplate 4. At one end the lever 23 carries a pin 25, which cooperates with the groove 21. At the other end the lever 23 carries a pin 26 which cooperates with slots 27A and 27B in overlapping portions of the playing-loop-guide supports 10A and 10B respectively. The pin 26 acts on the playing-loop-guide supports 10A and 10B at the area of overlap. This method of moving the playing-loop-guide supports is described in the previously filed but not duly published patent application Ser. No. 403,374 filed July 30, 1982 (herewith incorporated by reference).

The fast-winding-loop-guide supports 14 and 15 are journalled on the deck plate 4 by means of pivots 28 and 29 respectively. They are movable between their various positions by means of a lever situated underneath the deck plate 4, which lever is represented by the dash-dot line 30. This lever cooperates with the groove 22 in the worm wheel 20 by means of a pin 31 and is pivotally connected to the fast-winding-loop-guide supports 14 and 15 by means of two pivots 32 and 33.

In FIG. 1 the deck is in the rest position. In this position the cassette 1 can be placed on or removed from the deck without the magnetic tape 2 being impeded by elements of the deck. In the cassette the magnetic tape is supported by two tape supports 34A and 34B, so that a portion 35 of the magnetic tape 2 extends along the front of the cassette. The cassette has an aperture 37 bounded by the wall 36 at the wall 36 at the front of the cassette for receiving the playing-loop guides 8A and 8B, the fast-winding-loop guides 12 and 13 and two tape guides 38A and 38B arranged on the playing-loop-guide supports 10A and 10B. The two draining elements 16A and 16B are spaced from the front side of the portion 35 of magnetic tape.

When the motor 18 is started the worm wheel 20 is driven by the worm 19 in the direction of the arrow A in FIG. 1. When the wheel 20 is not rotated beyond the position shown in FIG. 3, only the lever 30 is moved as a result of the cooperation of the pin 31 with the groove 22, so that the fast-winding-loop guide supports 14 and 15 are pivoted into the position shown in FIG. 3. As a result of this displacement of the fast-winding-loop guides 12 and 13 the portion 35 of magnetic tape is lifted off the tape supports 34A and 34B in the cassette and is withdrawn from the cassette until the fast-winding loop shown in FIG. 3 is obtained, the front of the magnetic tape being in contact with the draining elements 16A and 16B. Consequently, this position of the worm wheel 20, which is detected by means (not shown) such as switches or optical-ray barrier means, corresponds to the fast-winding mode of the deck.

Figure 2:
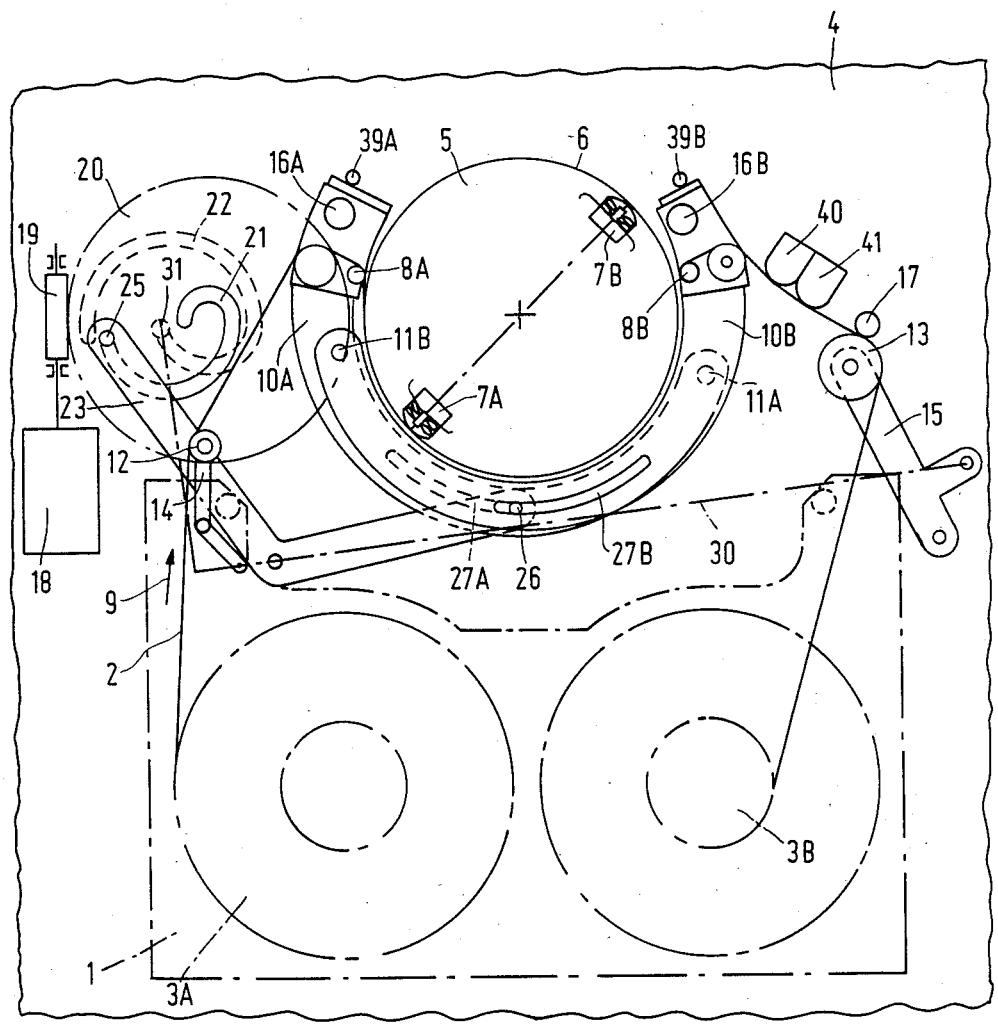
FIG. 2 is a view similar to FIG. 1 but showing the magnetic tape wrapped around the drum for a "play" mode of operation of the deck.
Figure 3:
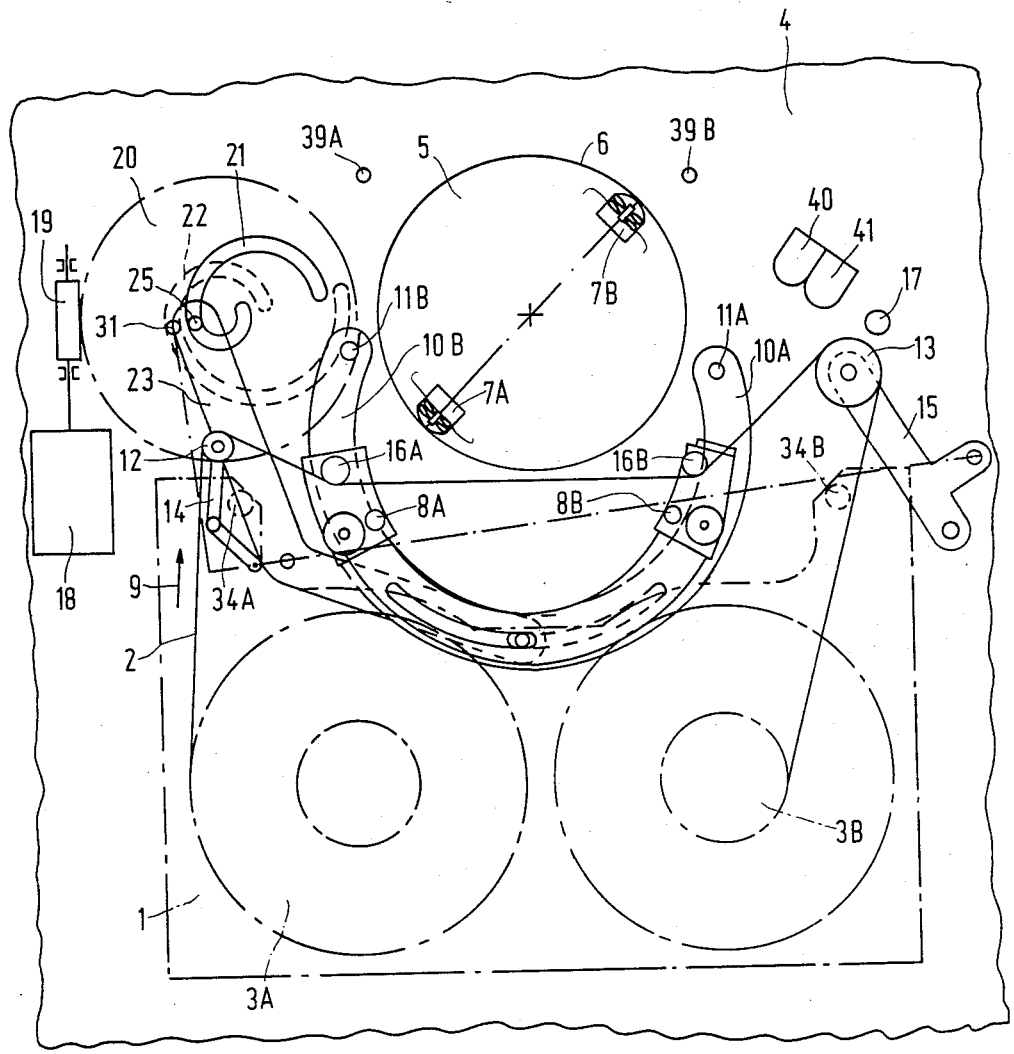
FIG. 3 is another view similar to FIG. 1 but showing a fast-winding situation for a fast-winding mode of operation of the deck and with the front of the magnetic tape in contact with two elements for draining static electricity.

As the worm wheel 20 is rotated further from its position shown in FIG. 3 to its position shown in FIG. 2 the lever 30 is moved slightly further, so that the fast-winding-loop guide 12 is swung out slightly further and also the fast-winding-loop guide 13 is moved so far that it presses the magnetic tape against the capstan 17. In this position the fast-winding-loop guide 13 serves as pressure roller. Simultaneously, the pin 25 on the lever 23 cooperates with the guide groove 21 in the upper surface of the worm wheel 20 so that the lever is pivoted about the pivot 24 and thereby moves the two playing-loop-guide supports 10A and 10B from the inoperative position shown in FIG. 1 to the operative position shown in FIG. 2.

In the operative position the ends of the playing-loop-guide supports 10A and 10B bear against end stops 39A and 39B on the deck plate. The magnetic tape has been withdrawn from the cassette to form a basically M-shaped playing loop, the drum 5 being situated in the central part of the playing loop and the reels 3A and 3B being situated at the ends of the limbs of the M-shaped loop. In this situation the magnetic heads 7A and 7B can cooperate with the length of magnetic tape which has been wrapped around the circumferential surface 6 of the drum to reproduce signals from and/or record signals on the magnetic tape. Two stationary magnetic heads 40 and 41 are fixed on the deck plate 4 and are also in contact with the front side of a part of the magnetic tape.

Although the drawing shows only one embodiment of the invention, many different embodiments are posible within the scope as defined in the claims. Some examles are as follows:

The deck may be provided with a single draining element only and, if desired, with a signle fast-winding-loop guide only if the cassette comprises tape guides which are suitable for guiding the magnetic tape during fast winding.

The deck may be equipped with playing-loop-guide supports of an entirely different construction from that shown, for example, carriages guided along guideways and driven by belts, see German Offenlegungschrift No. 2934225 to which U.S. Pat. No. 4,339,776 corresponds (herewith incorporated by reference), .or two rings which rotate into opposite directions, see U.S. Pat. No. 4,121,267 (herewith incorporated by reference).

The invention is not limited to tape decks comprising a playing-loop device which withdraws the magnetic tape from the cassette to form an M-shaped loop. The invention may also be used to advantage in a deck as described in the afore-mentioned U.S. Pat. No. 3,939,491 (herewith incorporated by reference), in particular when the distance between the cassette and the drum is reduced with the result that less room is available for stationary tape guides arranged on the deck plate.

The deck in accordance with the invention has substantial additional advantages when used in magnetic video tape equipment for use in conjunction with an electronic camera, for example, as known from the two German Offenlegungsschriften Nos. 3043041 and 3105536 (herewith incorporated by reference). The deck may be incorporated in the electronic camera itself or in a portable cassette recorder which is connected to the camera by a cable. For such uses it is important that the deck can be set to a stand-by mode in which the video heads rotate without being in contact with the magnetic tape and the playing loop is already partially formed, and in which the pressure roller does not yet press the magnetic tape against the capstan so that no tape transport takes place. As soon as a recording is to be made the playing loop is formed into its final shape. This should be effected as rapidly as possible.

As is shown in the drawing, the deck in accordance with the invention may be constructed so that the fast-winding loop is in fact the first stage in the formation of the playing loop. The fast-winding mode represented in FIG. 3 may then be used as the stand-by mode, provided that in the stand-by mode the tape is not yet driven between the two reels. It has been found that in a small deck suitable for incorporation into an electronic camera, starting from the stand-by mode shown in FIG. 3 the formation of the playing loop to obtain the situation shown in FIG. 2 can be completed within one second.

What is claimed is:

1. A magnetic-tape deck for cassettes containing a magnetic tape wound on and transported between two reels, comprising:
   a chassis,
   a circular cylindrical drum having a circumferential surface defining a drum axis,
   at least one magnetic head mounted to said drum and movable in a circular path about said axis,
   a playing-loop device for withdrawing a length of magnetic tape from a cassette placed on the deck, to form a playing loop when the deck is in a "play" mode of operation, said playing loop having a central part and two ends, said ends being at the respective reels within the cassette, the central part of the loop wrapped around a part of said drum for cooperation with said at least one magnetic head; said playing-loop device comprising first and second playing-loop-guide supports having respective first and second playing-looped guides mounted thereon; and said supports being movable between an inoperative position in which the respective guides are disposed in the cassette, and an operative position in which the playing-loop guides are in guide positions respectively upstream and downstream of the drum for guiding the playing loop,
   fast-winding means for winding said magnetic tape between the reels in the cassette during a "fast forward" or "fast reverse" mode of operation, said means comprising a fast-winding-loop device for withdrawing a length of magnetic tape from the cassette and subsequently guiding it to form a fast-winding loop outside the cassette; said fast-winding-loop device comprising a fast-winding-loop guide support to which a fast-winding-loop guide is fixed, said fast-winding-loop guide support being movable with respect to said chassis between an inward position, in which the fast-winding-loop guide is disposed inside the cassette behind the magnetic tape, and a fast-winding position, in which the fast-winding-loop guide is disposed outside the cassette; and said fast-winding means further comprising means for moving the fast-winding-loop guide support between said inward and fast-winding positions, and at least one draining element formed of an electrically conductive material, so arranged that during a fast-winding mode of operation said at least one draining element contacts that surface of the length of magnetic tape which contacts the drum during operation in the play mode, for draining static electricity from said surface of the magnetic tape, characterized in that said draining element is arranged on one of said playing-loop-guide supports such that the magnetic tape passes between said playing-loop-guide and said draining element, when the playing-loop-guide support is in the inoperative position said draining element and the respective playing-loop-guide being substantially opposite each other with respect to the magnetic tape.

2. A deck as claimed in claim 1, characterized in that said draining element is so disposed on the respective playing-loop-guide support that in "play" mode of operation of the deck the draining element is clear of the magnetic tape.

3. A deck as claimed in claim 2, characterized in that, in the fast winding modes of operation, said playing-loop-guide supports are in the inoperative position, and comprising two said fast-winding-loop guides and two said fast-winding-loop guide supports so arranged that, during fast-winding, said playing-loop guides are disposed between the fast-winding-loop-guides, and two said draining elements, each carried on a respective playing-loop-guide support.

4. A deck as claimed in claim 1, further comprising a capstan arranged to engage said tape in the "play" mode of operation, having an accurately controlled rotational speed, and a pressure-roller support on which a pressure roller is mounted for rotation about axis parallel to the capstan axis, said pressure-roller support being movable between an inward position in which the pressure roller is located behind the magnetic tape within the cassette, and a pressing position in which the pressure roller presses the magnetic tape against the capstan, characterized in that said pressure roller serves as said fast-winding-loop guide and the pressure roller support serves as the fast-winding-loop guide support, in the fast-winding position of the fast-winding-loop-guide support said pressure roller being disposed between said inward position and said pressing position.

5. A deck as claimed in claim 4, characterized by comprising two fast-winding-loop guides and two fast-winding-loop-guide supports so arranged that, during fast-winding, said playing-loop guides are disposed between the fast-winding-loop-guides, and that one of said fast-winding-loop-guide supports is said pressure roller support; and two said draining elements, each carried on a respective playing-loop-guide support.

6. A deck as claimed in claim 5, characterized in that said other fast-winding-loop-guide support is in a same position in the play mode and in the fast forward winding and fast reverse winding modes of operation.

7. A deck as claimed in claim 6, characterized in that, in the fast winding modes of operation, said playing-loop-guide supports are in the inoperative position.

8. A magnetic-tape deck for cassettes containing a magnetic tape wound on and transported between two reels, comprising:

a chassis, a circular cylindrical drum having a circumferential surface defining a drum axis, at least one magnetic head mounted to said drum and movable in a circular path about said axis, a playing-loop device for withdrawing a length of magnetic tape from a cassette placed on the deck, to form a playing loop when the deck is in a "play" mode of operation, said playing loop having a central part and two ends, said ends being at the respective reels within the cassette, the central part of the loop being wrapped around a part of said drum for cooperation with said at least one magnetic head; said playing-loop device comprising first and second playing-loop-guide supports having respective first and second playing-looped guides mounted thereon; and said supports being movable between an inoperative position in which the respective guides are disposed in the cassette, and an operative position in which the playing-loop guides are in guide positions respectively upstream and downstream of the drum for guiding the playing loop, fast-winding means for winding said magnetic tape between the reels in the cassette during a "fast forward" or "fast reverse" mode of operation, said means comprising a fast-winding-loop device for withdrawing a length of magnetic tape from the cassette and subsequently guiding it to form a fast-winding loop outside the cassette; said fast-winding-loop device comprising a fast-winding-loop guide support to which a fast-winding-loop guide is fixed, said fast-winding-loop guide support being movable with respect to said chassis between an inward position, in which the fast-winding-loop guide is disposed inside the cassette behind the magnetic tape, and a fast-winding position, in which the fast-winding-loop guide is disposed outside the cassette; and said fast-winding means further comprising means for moving the fast-winding-loop guide support between said inward and fast-winding positions, and at least one draining element formed of an electrically conductive material, so arranged that during a fast-winding mode of operation said at least one draining element contacts that surface of the length of magnetic tape which contacts the drum during operation in the play mode, for draining static electricity from said surface of the magnetic tape, characterized in that said draining element is arranged on one of said playing-loop-guide supports such that the magnetic tape passes between said playing-loop-guide and said draining element, in the fast winding modes of operation said playing-loop-guide-supports being in the inoperative position.

9. A deck as claimed in claim 8, characterized in that said draining element is so disposed on the respective playing-loop-guide support that in "play" mode of operation of the deck the draining element is clear of the magnetic tape.

10. A deck as claimed in claim 8, characterized by comprising two said fast-winding-loop guides and two said fast-winding-loop guide supports so arranged that, during fast-winding, said playing-loop guides are disposed between the fast-winding-loop-guides, and two said draining elements, each carried on a respective playing-loop-guide support.

11. A deck as claimed in claim 8, further comprising a capstan arranged to engage said tape in the "tape" mode of operation, having an accurately controlled rotational speed, and a pressure-roller support on which a pressure roller is mounted for rotation about axis parallel to the capstan axis, said pressure-roller support being movable between an inward position in which the pressure roller is located behind the magnetic tape within the cassette, and a pressing position in which the pressure roller presses the magnetic tape against the capstan, characterized in that said pressure roller serves as said fast-winding-loop guide and the pressure roller support serves as the fast-winding-loop guide support, in the fast-winding position of th fast-winding-loop-guide support said pressure roller being disposed between said inward position and said pressing position.

12. A deck as claimed in claim 11, characterized in that said draining element is so disposed on the respective playing-loop-guide support that in "play" mode of operation of the deck the draining element is clear of the magnetic tape.

* * * * *

UNITED STATES PATENT AND TRADEMARK OFFICE
CERTIFICATE OF CORRECTION

PATENT NO. : 4,578,725
DATED : March 25, 1986
INVENTOR(S) : JOHANNES C. A. MULLER It is certified that error appears in the above-identified patent and that said Letters Patent is hereby corrected as shown below:

Claim 11, line 2, Change ' "tape" ' to --"play"--

Signed and Sealed this

Fourteenth Day of April, 1987

Attest:

DONALD J. QUIGG

*Attesting Officer*   *Commissioner of Patents and Trademarks*